US009772998B2

(12) United States Patent
Anisimovich et al.

(10) Patent No.: US 9,772,998 B2
(45) Date of Patent: Sep. 26, 2017

(54) INDICATING AND CORRECTING ERRORS IN MACHINE TRANSLATION SYSTEMS

(71) Applicant: ABBYY InfoPoisk LLC, Moscow, OT (RU)

(72) Inventors: Konstantin Anisimovich, Moscow (RU); Tatiana Danielyan, Moscow (RU); Vladimir Selegey, Moscow (RU); Konstantin Zuev, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 14/284,833

(22) Filed: May 22, 2014

(65) Prior Publication Data

US 2014/0257786 A1    Sep. 11, 2014

Related U.S. Application Data

(63) Continuation of application No. 13/359,392, filed on Jan. 26, 2012, now Pat. No. 8,959,011, which is a
(Continued)

(51) Int. Cl.
*G06F 17/28* (2006.01)

(52) U.S. Cl.
CPC ........ *G06F 17/289* (2013.01); *G06F 17/2854* (2013.01)

(58) Field of Classification Search
CPC .. G06F 17/28; G06F 17/2827; G06F 17/2836; G06F 17/2854; G06F 17/289
(Continued)

(56) References Cited

U.S. PATENT DOCUMENTS 4,599,612 A * 7/1986 Kaji ................... G06F 17/2836
704/3
4,706,212 A    11/1987 Toma
(Continued)

FOREIGN PATENT DOCUMENTS

| EP | 2400400 A1 | 12/2011 |
|---|---|---|
| WO | 2011/160204 A1 | 12/2011 |

OTHER PUBLICATIONS

Bolshakov, "Co-Ordinative Ellipsis in Russian Texts: Problems of Description and Restoration", Published in: Proceeding COLING '88 Proceedings of the 12th conference on Computational linguistics—vol. 1 doi>10.3115/991635.991649, 1988, 65-67.
(Continued)

*Primary Examiner* — Martin Lerner
(74) *Attorney, Agent, or Firm* — Lowenstein Sandler LLP (57) ABSTRACT

The preferred embodiments provide an automated machine translation from one language to another. The source language may contain expressions or words that are not readily handled by the translation system. Such problematic words or word combinations may, for example, include the words not found in the dictionary of the translation system, as well as text fragments corresponding to structures with low ratings. To improve translation quality, such potentially erroneous words or questionable word combinations are identified by the translation system and displayed to a user by distinctive display styles in the display of a document in the source language and in its translation to a target language. A user is provided with a capability to correct erroneous or questionable words so as to improve the quality of translation.

19 Claims, 3 Drawing Sheets

Related U.S. Application Data continuation-in-part of application No. 11/690,102, filed on Mar. 22, 2007, now Pat. No. 8,195,447.

(58) Field of Classification Search
USPC .......... 704/2, 3, 4, 9, 277; 715/264, 265
See application file for complete search history.

(56) References Cited

U.S. PATENT DOCUMENTS

| | | |
|---|---|---|
| 5,068,789 A | 11/1991 | Van Vliembergen |
| 5,128,865 A | 7/1992 | Sadler |
| 5,146,405 A | 9/1992 | Church |
| 5,175,684 A | 12/1992 | Chong |
| 5,268,839 A | 12/1993 | Kaji |
| 5,301,109 A | 4/1994 | Landauer et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibil |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,535,120 A | 7/1996 | Chong et al. |
| 5,550,934 A | 8/1996 | Van Vliembergen et al. |
| 5,559,693 A | 9/1996 | Anick et al. |
| 5,677,835 A | 10/1997 | Carbonell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,799,268 A | 8/1998 | Boguraev |
| 5,826,219 A | 10/1998 | Kutsumi |
| 5,826,220 A | 10/1998 | Takeda et al. |
| 5,848,385 A | 12/1998 | Poznanski et al. |
| 5,867,811 A | 2/1999 | O'Donoghue |
| 5,873,056 A | 2/1999 | Liddy et al. |
| 5,884,247 A | 3/1999 | Christy |
| 6,006,221 A | 12/1999 | Liddy et al. |
| 6,016,467 A * | 1/2000 | Newsted et al. .......... 704/9 |
| 6,055,528 A | 4/2000 | Evans |
| 6,076,051 A | 6/2000 | Messerly et al. |
| 6,081,774 A | 6/2000 | de Hita et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,243,669 B1 | 6/2001 | Horiguchi et al. |
| 6,243,670 B1 | 6/2001 | Bessho et al. |
| 6,243,689 B1 | 6/2001 | Norton |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,463,404 B1 | 10/2002 | Appleby |
| 6,470,306 B1 | 10/2002 | Pringle et al. |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson |
| 7,146,358 B1 | 12/2006 | Gravano et al. |
| 7,167,824 B2 | 1/2007 | Kallulli |
| 7,191,115 B2 | 3/2007 | Moore |
| 7,200,550 B2 | 4/2007 | Menezes et al. |
| 7,236,932 B1 * | 6/2007 | Grajski .................. 704/277 |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,475,015 B2 | 1/2009 | Epstein et al. |
| 7,620,539 B2 * | 11/2009 | Gaussier et al. .................. 704/2 |
| 7,672,831 B2 | 3/2010 | Todhunter et al. |
| 7,739,102 B2 | 6/2010 | Bender |
| 8,078,450 B2 | 12/2011 | Anisimovich et al. |
| 8,078,551 B2 | 12/2011 | Bar |
| 8,145,473 B2 | 3/2012 | Anisimovich et al. |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,271,453 B1 | 9/2012 | Pasca et al. |
| 8,285,728 B1 | 10/2012 | Rubin |
| 8,296,124 B1 | 10/2012 | Holsztynska et al. |
| 8,301,633 B2 | 10/2012 | Cheslow |
| 8,402,036 B2 | 3/2013 | Blair-Goldensohn et al. |
| 8,412,513 B2 | 4/2013 | Anisimovich et al. |
| 8,533,188 B2 | 9/2013 | Yan et al. |
| 8,548,795 B2 | 10/2013 | Anisimovich et al. |
| 8,548,951 B2 | 10/2013 | Solmer et al. |
| 8,554,558 B2 | 10/2013 | McCarley et al. |
| 8,577,907 B1 | 11/2013 | Singhal et al. |
| 8,918,309 B2 * | 12/2014 | Tuganbaev ......... G06F 17/2755 704/2 |
| 8,959,011 B2 * | 2/2015 | Anisimovich et al. ......... 704/2 |
| 9,047,275 B2 * | 6/2015 | Parfentieva ......... G06F 17/2785 |
| 9,053,090 B2 * | 6/2015 | Anisimovich ...... G06F 17/2755 |
| 9,069,750 B2 * | 6/2015 | Zuev .................. G06F 17/27 |
| 9,075,864 B2 * | 7/2015 | Zuev .................. G06F 17/2755 |
| D746,312 S * | 12/2015 | Danielyan .................. D14/486 |
| 9,262,409 B2 * | 2/2016 | Anisimovich ........ G06F 17/289 |
| 9,323,747 B2 * | 4/2016 | Anisimovich ...... G06F 17/2755 |
| 9,471,562 B2 * | 10/2016 | Anisimovich ......... G06F 17/277 |
| 2001/0014902 A1 | 8/2001 | Hu et al. |
| 2001/0029455 A1 | 10/2001 | Chin et al. |
| 2002/0040292 A1 | 4/2002 | Marcu |
| 2002/0065647 A1* | 5/2002 | Hatori et al. .................. 704/2 |
| 2003/0145285 A1 | 7/2003 | Miyahira et al. |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0002848 A1* | 1/2004 | Zhou et al. .................. 704/2 |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2005/0010421 A1 | 1/2005 | Watanabe et al. |
| 2005/0015240 A1 | 1/2005 | Appleby |

(56) References Cited

U.S. PATENT DOCUMENTS

| | | |
|---|---|---|
| 2005/0080613 A1 | 4/2005 | Colledge et al. |
| 2005/0086047 A1 | 4/2005 | Uchimoto et al. |
| 2005/0137853 A1 | 6/2005 | Appleby et al. |
| 2005/0155017 A1 | 7/2005 | Berstis et al. |
| 2005/0171757 A1 | 8/2005 | Appleby |
| 2005/0171758 A1* | 8/2005 | Palmquist ............... G10L 15/26 704/4 |
| 2005/0209844 A1 | 9/2005 | Wu et al. |
| 2005/0240392 A1 | 10/2005 | Munro et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0100601 A1 | 5/2007 | Kimura |
| 2007/0130563 A1* | 6/2007 | Elgazzar ................ G06F 17/28 717/137 |
| 2008/0133218 A1 | 6/2008 | Zhou et al. |
| 2008/0228464 A1 | 9/2008 | Al-Onaizan et al. |
| 2009/0070094 A1 | 3/2009 | Best et al. |
| 2009/0083023 A1* | 3/2009 | Foster et al. ..................... 704/3 |
| 2010/0082324 A1 | 4/2010 | Itagaki et al. |
| 2011/0055188 A1 | 3/2011 | Gras |
| 2011/0246173 A1 | 10/2011 | Li et al. |
| 2011/0301941 A1 | 12/2011 | De Vocht |
| 2012/0023104 A1 | 1/2012 | Johnson et al. |
| 2012/0030226 A1 | 2/2012 | Holt et al. |
| 2012/0131060 A1 | 5/2012 | Heidasch |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0271627 A1* | 10/2012 | Danielyan ........... G06F 17/2755 704/9 |
| 2012/0296897 A1 | 11/2012 | Xin-Jing et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0132065 A1* | 5/2013 | Danielyan ........... G06F 17/2836 704/3 |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang |
| 2014/0012842 A1 | 1/2014 | Yan et al. |
| 2014/0114649 A1 | 4/2014 | Zuev et al. |

OTHER PUBLICATIONS

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

INDICATING AND CORRECTING ERRORS IN MACHINE TRANSLATION SYSTEMS

CROSS-REFERENCE TO RELATED APPLICATIONS

The present application is a continuation of U.S. patent application Ser. No. 13/359,392 filed on Jan. 26, 2012, now U.S. Pat. No. 8,959,011 issued Feb. 17, 2015, which is a continuation-in-part of U.S. patent application Ser. No. 11/690,102 titled "Translating Sentences Between Languages Using Language-Independent Semantic Structures and Ratings of Syntactic Constructions," filed on Mar. 22, 2007, now issued U.S. Pat. No. 8,195,447 (with issue date of Jun. 5, 2012). All subject matter of the U.S. patent application Ser. No. 13/359,392 and of all its parent, grandparent, great-grandparent, etc. applications is incorporated herein by reference to the extent such subject matter is not inconsistent herewith.

BACKGROUND OF THE INVENTION

Field of Disclosure

The preferred embodiments generally relate to the field of automated translation of natural languages and related user interfaces.

Related Art

Machine translation (MT) systems are capable of recognizing complex language constructs and producing translations of texts from one language into another. However, in the process such a system may encounter words that it is unable to identify, words that have no translations in a dictionary, language construction that cannot be parsed, and simply errors, misprints, and the like. Some of systems break down in these situations, other systems transfer the errors into the translation text, sometimes transliterating unknown words if the input and output alphabets are different. A user is incapable of providing a meaningful input into the system to alleviate such problems, which are not highlighted by the system. Since the user does not see potentially erroneous points in the source text, he/she cannot estimate the quality of its translation (the target text), especially if he/she does not know the target language sufficiently well.

SUMMARY OF THE INVENTION

The preferred embodiments generally relate to methods, computer-readable media, devices and systems for translating text from an input (source) language into an output (target) language. In one embodiment, the method and system of translating includes analyzing a source sentence using linguistic descriptions of the source language, constructing a language-independent semantic structure to represent the meaning of the source sentence, and generating an output sentence to represent the meaning of the source sentence in the output language using linguistic descriptions of the output language. To improve the accuracy of translation, the analysis and/or synthesis stage may include ratings and statistics obtained by analyzing a corpus of parallel texts.

To translate a text from one natural language to another one, a translation program analyzes the syntax and the semantics of a sentence. A translation program may employ diverse linguistic descriptions (e.g., morphological, syntactic, semantic and pragmatic descriptions) to "understand" the meaning of the sentence, to represent it in language-independent terms, and then to generate a corresponding sentence in the output language. During translation, a program may encounter the problem of disambiguation. One way to resolve the problem of disambiguation is to use different ratings to estimate variants of parsing and variants of synthesized structures, such that erroneous and incorrect structures would have low rating. The system can then bring such erroneous or incorrect structures to the attention of the user, who, in response, may improve the source text or correct the text of the translation.

Various ratings may be used both at an analysis stage and at a synthesis stage. Examples of generating a rating includes the use of statistics, a priori assessments of lexical meanings and various syntactical and lexical constructs which may be assigned manually, automatically or as a combination of manual and automatic assignment by means of applying special rules. Certain statistics may be obtained through analysis of a tagged corpus of parallel texts in a process known as statistical analysis.

In one preferred embodiment, as part of machine translation process, the system identifies one or more potentially erroneous words in the source text and the corresponding words in the target text. These potentially erroneous words are displayed to a user and indicated by one or more distinctive display styles. The user may change the potentially erroneous words in the source text and, in response, the system modifies the target text consistently with the changed source text.

One preferred embodiment performs lexical-morphological analysis of a source sentence so as to generate a lexical-morphological structure of the source sentence. If the lexical-morphological analysis identifies words which are not found in dictionaries or which have no morphological or lexical descriptions, the system displays at least one such word in a distinctive manner as potentially erroneous. The system also performs syntactic analysis of the lexical-morphological structure of the source sentence so as to generate a language-independent semantic structure. If during syntactic analysis, a hypothesis with a low rating is selected as a preferred syntactic structure, the system displays in a distinctive manner a fragment of the source sentence corresponding to the selected syntactic structure so as to indicate that the fragment is potentially erroneous. The system also performs syntactic synthesis so as to generate the target sentence in the target language. If during syntactic synthesis, a hypothesis with a low rating or a default structure is selected, the system displays in a distinctive manner a fragment of the source sentence, which corresponds to the hypothesis with a low rating or the default structure, so as to indicate that the fragment is potentially erroneous.

DETAILED DESCRIPTION

The preferred embodiments provide a computer method and a computer system configured for translating a document in an input language into an output language. It is to be understood that a document may be a sentence, sentence fragment, phrase, expression, page of text, Web page, sign, menu, label, and any other text.

A document may be translated using various MT systems. Some of such MT systems can analyze each sentence and recognize its linguistic structure and semantics in order to "understand" its meaning. If the system uses exhaustive linguistic descriptions to analyze a sentence in the input language, it can recognize the meaning of the sentence and subsequently generate an output sentence in the output language. Nevertheless, the problem of syntactical and semantic ambiguities may appear during several steps of translation process.

During automated translation process, different options may have different ratings. The ratings may be assigned to lexical selection options, for example, to word translation options and word combinations, and to syntactic parsing options, such as, parsing sentences, clauses and their fragments. Also, ratings may be assigned to applying rules of semantic interpretation or to other operations of semantic analysis. Each structure created in a given step, such as a syntactic tree and a semantic structure, may be estimated by means of evaluating its overall rating.

The text to be translated is not always carefully written and stylistically smooth. It may contain, for example, colloquial terms, abbreviations, which are absent in the dictionary of an MT system, slang words, internet slang, professional jargon, and the like, as well as simply errors and misprints. The source text also sometimes may contain incorrect syntactical constructions, ambiguous expressions, constructions which may have different variants of parsing. Typical MT systems break down in such cases, or transfer the errors and unknown words into the translation text, or produce a default translation, for example, word-by-word translation, without identifying the points where the system encountered problems.

Consequently, a user of such a typical system cannot estimate adequately the quality of the produced translation, and he/she is not provided with a mechanism to respond in time to the difficulties of the MT system. In the preferred embodiments, however, a user receives visual information concerning source words and constructions that are unknown to the MT system, as well as the information about ambiguous or incorrect expressions in the source text. As a result, when using the preferred system, a user can correct such problems so as to receive a quality translation into another language.

The errors in the source or/and target text may be displayed to a user. For example, the errors may be highlighted, underlined, distinguished by special font, color, italicizing, or distinguished by any other visual representation. After the user has corrected the source text, the system may repeat the translating process for the fragment at issue, which may be a word, a sentence, a paragraph, or the entire text.

Figure 1:
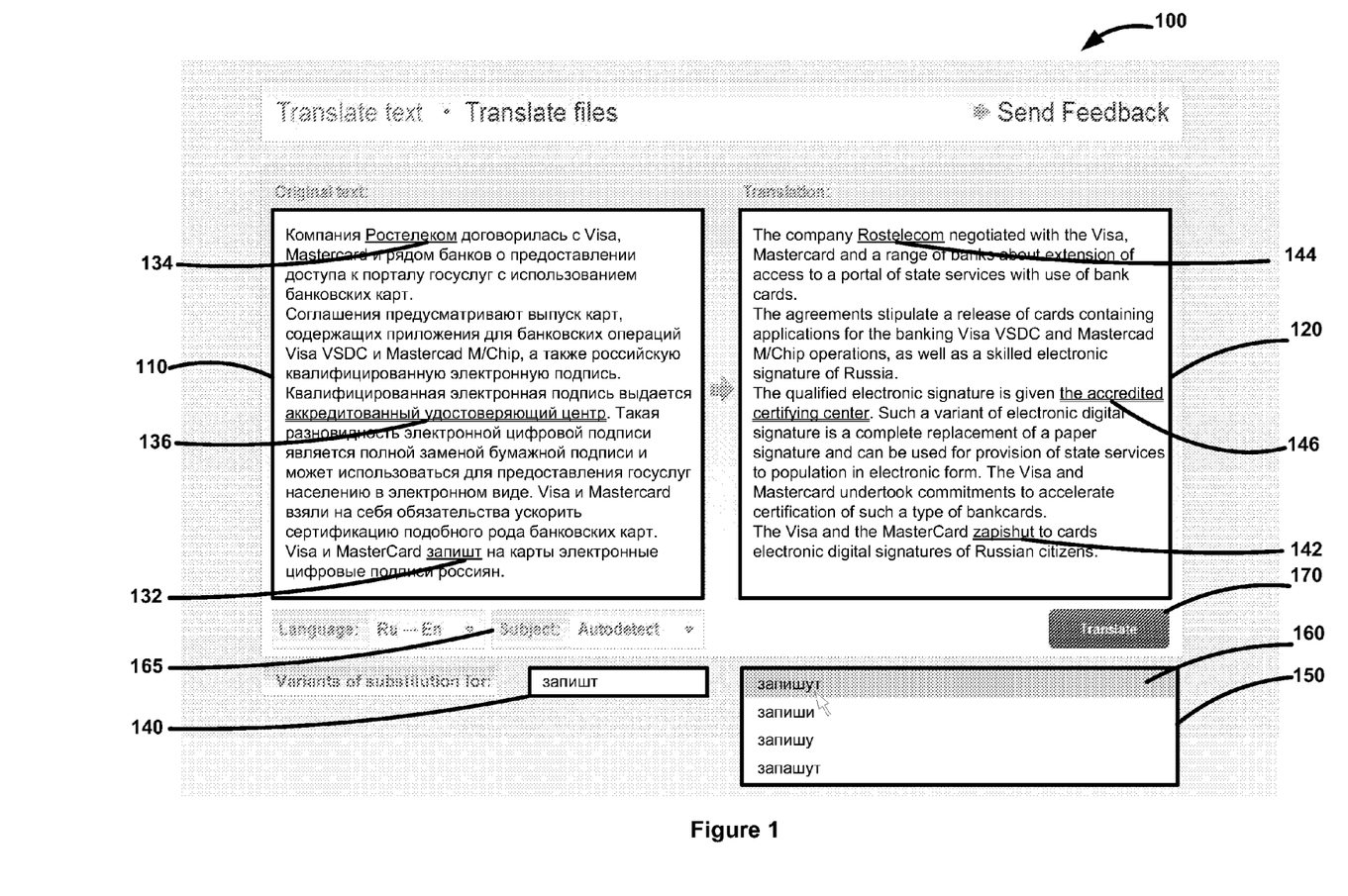
FIG. 1 is an example of an interface for machine translation.

FIG. 1 is an example of an interface 100 of for the machine translation process. It shows the original text in Russian in the left window (110) and its machine translation into English in the right window (120). A word, or fragment in the source text 110 or in translation text 120, may be underlined, highlighted or otherwise identified by the system and then corrected or replaced by the user. Errors of different types (lexical and syntactical) may be selected by different colors or other indications. For example, the error 132 is a lexical error, it is a misprint; the error 134 is also lexical because the system is not aware of the proper name; the error 136 is syntactical because the selected clause has an incorrect structure, and the system is unable to parse it successfully.

In the right window 120, the corresponding errors arising during translation are likewise indicated: the error 142 is a transliteration of the "unknown to the system" word, the error 144 is a transliteration of the unknown to the system proper name, 146 is a syntactical construction assigned a low rating during the synthesis because the corresponding source fragment was insufficiently recognized (parsed), Such insufficiently recognized structures have low rating during the analysis.

Since more frequent errors are typos, the system may suggest resembling substitution alternatives for separate words and collocations that have been identified as potentially erroneous. If a user selects, for example by a click, a word, which is potentially erroneous, in the source text or in the output text, the selected word may be displayed, for example, in a special window 140, and possible alternatives for substitution may be presented in the list box 150 where the user has an option to select an appropriate alternative 160. In FIG. 1, word 132 has been selected and appears in box 140. Suggested corrections of this word are displayed in box 150.

Additionally, box 165, entitled "Subject" allows a user to specify the subject of the translated text, for example, Business, Law, Patents, Medicine, Biology, etc. The box 165 allows a user to narrow the list of options to a particular subject or field of study in which the word at issue may have a particular or special meaning. For example, the word "class" to a computer programmer may have a particular meaning (e.g., a computing construction with certain features, characteristics or functionalities). If "Subject" is not selected, the default automatic detection ("Autodetect") is used, so that the subject area may be defined automatically, for example, by means of a text classifier, or by means of a syntactic and/or semantic analysis of the fragment or the whole text.

After the word is replaced, the text may be translated again. The button 170 initializes the process of translating the fragment or the entire file. The syntactical model of the word chosen by the user may be taken into account during this translation. The user may choose to replace a particular occurrence of the word in a given sentence or all such words found throughout the entire text.

This interface is useful for most MT systems. In one embodiment, even a simple statistical MT system may benefit from a user interface such as in FIG. 1, because in the process of translating, fragments and words of the source text are compared with patterns from data bases, a translation memory, or dictionaries. So, fragments and words of the source text that are not found in these resources may be selected as potentially erroneous, or the rating of syntactical constructions may depend on their frequency. These unidentified fragments or words are indicated in the above-described interface and the user has a capability to correct them thereby possibly improving the translation.

In another preferred embodiment, the above-described interface of FIG. 1 is provided to an MT system, which executes syntactical and semantic analysis of the source text. Such systems and corresponding methods for translating text from one language into another language are disclosed in U.S. Pat. No. 8,078,450 (U.S. patent application Ser. No. 11/548,214) titled "Method And System For Analyzing Various Languages And Constructing Language-Independent Semantic Structures", filed on Oct. 10, 2006, and its continuations-in-part: U.S. patent application Ser. No. 11/690,099 now abandoned), Ser. No. 11/690,102 know U.S. Pat. No. 8,195,447 issued Jun. 5, 2012), Ser. No. 11/690,104 now U.S. Pat. No. 8,214,199 issued Jul. 3, 2012)

all initially titled "Method And System For Translating Sentences Between Languages", filed on Mar. 22, 2007, U.S. patent application Ser. No. 12/187,131 titled "Method For Translating Documents From One Language Into Another Using A Database Of Translations, A Terminology Dictionary, A Translation Dictionary, And A Machine Translation System", and U.S. patent application Ser. No. 12/388,219 now U.S. Pat. No. 8,145,473 issued Mar. 27, 2012) titled "Deep Model Statistics Method For Machine Translation." The above-referenced patent and patent applications are incorporated herein by reference to the extent that they are not inconsistent herewith.

Figure 2:
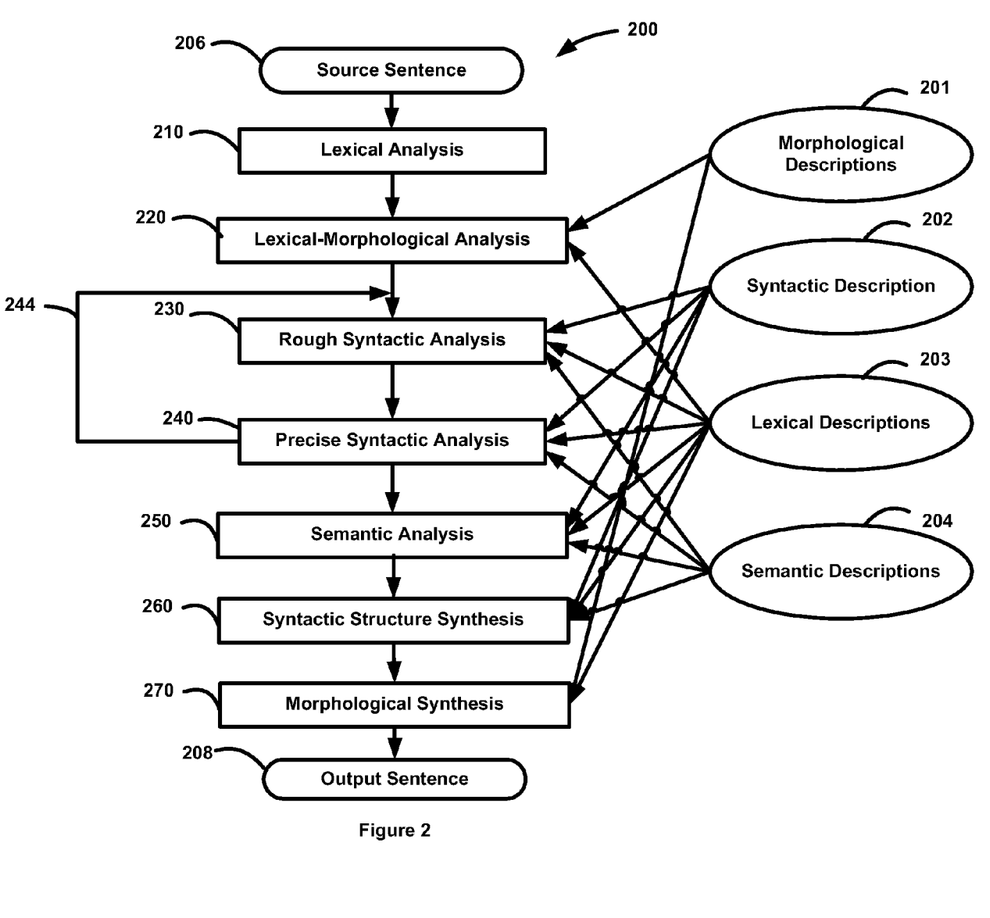
FIG. 2 illustrates an embodiment of translating the source sentence from a source language into the target sentence in a target language.

More specifically, FIG. 2 illustrates a computer method and system 200 for translating a source/input sentence 206 in a source language into an output sentence 208 in an output language, which make exhaustive syntactical and semantic analysis of the source sentence and transfers its meaning into the output sentence via a language-independent semantic structure. As shown in FIG. 2, the computer method and system 200 includes using linguistic descriptions adapted to perform various steps of analysis and synthesis. The linguistic descriptions may include morphological descriptions 201, syntactic descriptions 202, lexical descriptions 203, and semantic descriptions 204.

At 210, a lexical analysis is performed on the source sentence 206 in a source/input language. At 220, a lexical-morphological analysis is performed on the source sentence 206 to generate a lexical-morphological structure of the source sentence 206 using information from the morphological descriptions 201 and the lexical descriptions 203 of the source language. At this step, the words which are not found in dictionaries are detected. In addition, at this step, the system detects words which have no corresponding morphological descriptions 201 or the lexical descriptions 203.

Then, a syntactic analysis is performed on the lexical-morphological structure of the source sentence. In one embodiment, the syntactic analysis includes a first syntactic analysis and a second syntactic analysis, referred to, respectively, as a "rough syntactic analysis" and a "precise syntactic analysis." The two-step analysis algorithm (rough syntactic analysis and precise syntactic analysis) uses linguistic models and knowledge at various levels to calculate probability ratings and to generate essentially the most probable syntactic structure, which may be considered the best syntactic structure. Accordingly, at step 230, a rough syntactic analysis is performed on the source sentence to generate a graph of generalized constituents for further processing by the precise syntactic analysis. The graph of generalized constituents is the structure that reflects essentially all potentially possible relationships in the source sentence.

During rough syntactic analysis, the number of different constituents which may have been built and the syntactic relationships among them are considerably large. Therefore, some of the surface models of the constituents are chosen to be filtered through the process of filtering prior to and after the building the constituents in order to greatly reduce the number of different constituents to be considered. Thus, at the early stage of the rough syntactic analysis, the most suitable surface models and syntactic forms are selected on the basis of a priori rating. Such prior rough ratings include ratings of lexical meanings, ratings of fillers, and ratings of the correspondence to semantic descriptions, among others.

At step 240, a precise syntactic analysis is performed on the graph of generalized constituents to generate one or more syntactic trees to represent the source sentence from the graph of generalized constituents. This two-step syntactic analysis approach ensures accurately representing the meaning of the source sentence into a best syntactic structure which is chosen from one or more syntactic trees. In addition, hypotheses for a portion of a sentence, which are used for analyzing its meaning and generating an appropriate language structure using available linguistic descriptions, are verified within the hypotheses about the language structure for the entire sentence. In order to select the best syntactic structure, the system rates each syntactic tree representing the whole sentence. This approach avoids analyzing numerous parsing variants, which are known to be invalid.

The best syntactic tree is obtained on the basis of calculating ratings using a priori ratings from the graph of the generalized constituents. The a priori ratings may include ratings of the lexical meanings, such as frequency (or probability), ratings of each of the syntactic constructions (e.g., idioms, collocations, etc.) for each element of the sentence, and the degree of correspondence of the selected syntactic constructions to the semantic descriptions of the deep slots.

At this step 240 of precise syntactic analysis, at first, the syntactic tree with the best rating is selected. Then non-tree links on the selected tree are established to obtain the best syntactic structure. If the system cannot establish the non-tree links, the hypothesis may be rejected, and the next by rating hypothesis is chosen as illustrated by the return arrow 244 on the FIG. 2. As a result, if the hypothesis with low rating is selected as the "best" syntactic structure, the corresponding fragment of the source sentence may be shown to the user as underlined, highlighted, or the like on interface of FIG. 1 indicating that it is incorrect, low rating, or ambiguous.

At step 250, semantic analysis constructs a language-independent semantic structure, representing the meaning and all syntactic parameters of the source sentence in semantic language-independent terms. After the language-independent semantic structure has been built, the next step 260 is syntactic synthesis, which generates the output sentence in the output language. This step includes, but not limited to, generating a surface syntactic structure of the sentence in the output language and lexical selection. Various ratings may influence lexical selection, such as, ratings of the lexical meanings, ratings of the deep slots fillings, ratings of identifying word-combinations, ratings of deep slots correspondences, ratings of the correspondence to the local and global pragmatic contexts, ratings of the correspondence to the terminological sphere, and ratings of the correspondence to the previous selection. Since there may be many lexical meanings meeting the conditions of lexical selection, lexical meanings with the best ratings are selected at first.

But, there are cases when the rules of lexical selection and structure correction should be used. These rules are used when the semantic structure needs correction in order to overcome the asymmetries between the universal semantic description and the language-specific syntactic structure. The surface structure is built by means of a top-down traversal of the semantic structure. During this traversal, semantic, lexical and syntactic properties of each constituent are specified more accurately, and, first of all, the surface slots corresponding to the deep slots are determined, the linear order is defined, movements are restored, structural and referential control is checked. If some of these steps has ended in failure, the next by rating hypothesis (surface structure or lexical selection) is chosen. At the worst, a "default" structure may be chosen. As a result, if the hypothesis with low rating or the default structure is selected, the corresponding fragment of the source sentence may be indicated to user on the interface of FIG. 1 (for example, as underlined or highlighted) so as to identify it as incorrect, having a low rating, or ambiguous. The last step 270 is the morphology synthesis of the output sentence in the output language.

Figure 3:
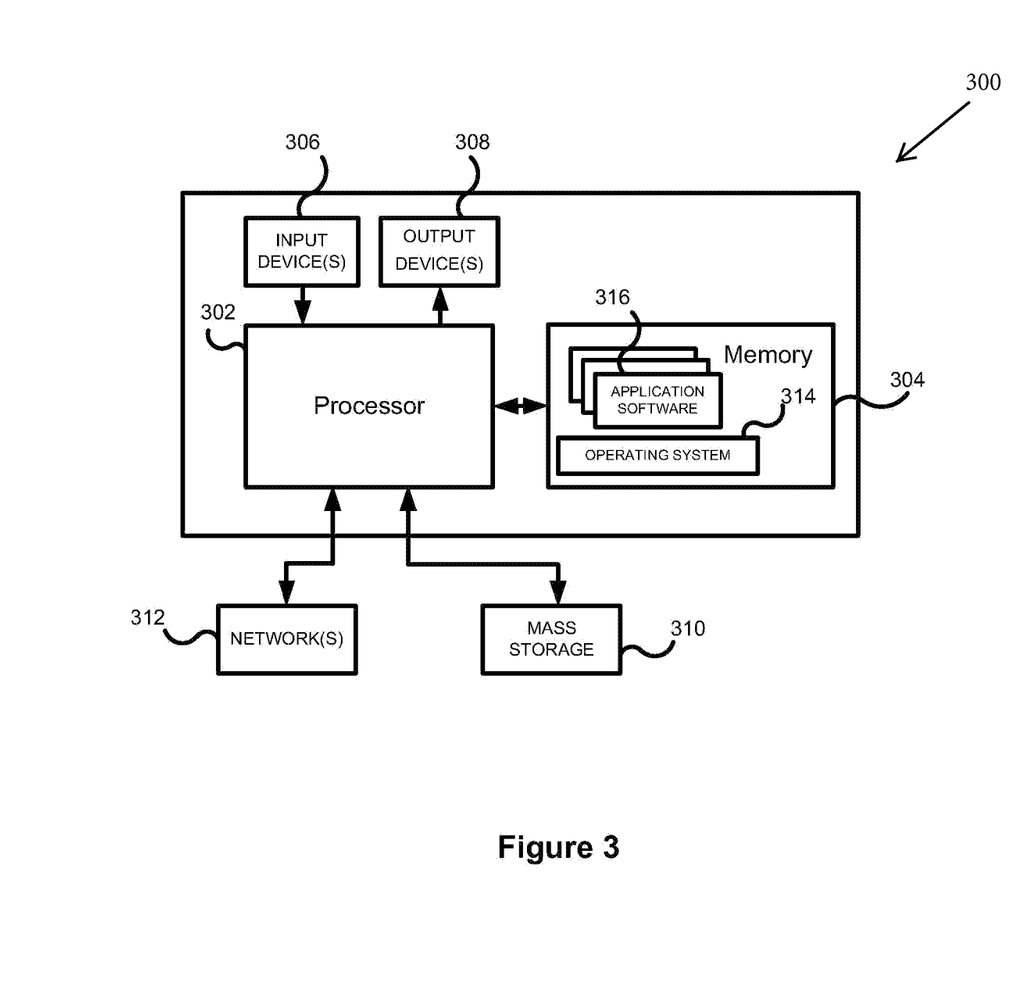
FIG. 3 illustrates an example of a computer system in accordance with one embodiment.

FIG. 3 illustrates an example of a computer system in accordance with one embodiment. Hardware of the system in FIG. 3 typically includes at least one processor 302 coupled to a memory 304. The processor 302 may represent one or more processors (e.g. microprocessors), and the memory 304 may represent random access memory (RAM) devices comprising a main storage of the hardware 300, as well as any supplemental levels of memory, e.g., cache memories, non-volatile or back-up memories (e.g., programmable or flash memories), read-only memories, and the like. In addition, the memory 304 may include memory storage physically located elsewhere in the hardware 300, e.g. any cache memory in the processor 302 as well as any storage capacity used as a virtual memory, e.g., as stored on a mass storage device 310.

The hardware of FIG. 3 also typically receives a number of inputs and outputs for communicating information externally. For interfacing with a user or operator, the hardware of FIG. 3 may include one or more user input devices 306 (e.g., a keyboard, a mouse, imaging device, scanner) and a one or more output devices 308 (e.g., a Liquid Crystal Display (LCD) panel, a sound playback device (speaker)). At least one display and a user input device are provided to the user of the preferred embodiments. Optionally, the display and input device may be integrated into a single device such as a touch screen. For additional storage, the hardware 300 may also include one or more mass storage devices 310, e.g., a removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 300 may include an interface with one or more networks 312 (e.g., a local area network (LAN), a wide area network (WAN), a wireless network, and/or the Internet among others) to permit the communication of information with other computers coupled to the networks. It should be appreciated that the hardware of FIG. 3 typically includes suitable analog and/or digital interfaces between the processor 302 and each of the components 304, 306, 308, and 312 as is well known in the art.

The hardware of FIG. 3 operates under the control of an operating system 314, and executes various computer software applications, components, programs, objects, modules, and the like to implement the techniques described above. Moreover, various applications, components, programs, objects, etc., collectively indicated by reference 316 in FIG. 3, may also execute on one or more processors in another computer coupled to the hardware via a network 312, e.g. in a distributed computing environment, whereby the processing required to implement the functions of a computer program may be allocated to multiple computers over a network.

In general, the routines executed to implement the embodiments of the invention may be implemented as part of an operating system or as a specific application, component, program, object, module or sequence of instructions referred to as "computer programs." The computer programs typically comprise one or more computer instructions stored in memory and other storage devices in a computer, and that, when read and executed by one or more processors in a computer, cause the computer to perform operations necessary to execute elements involving the various aspects of the preferred embodiment. Moreover, while the preferred embodiments have been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, removable disks, hard disk drives, optical disks (e.g., Compact Disk Read-Only Memory (CD-ROMs), Digital Versatile Disks (DVDs)) and flash memory, among others. Programs may be downloaded over the Internet to a computer device, which may be a personal computer, handheld device, workstation, distributed computer system, or another computer device.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast, the disclosed embodiments may be readily modifiable in arrangement and detail as facilitated by enabling technological advancements without departing from the principles of the present disclosure. It is intended that the appended claims be construed to include alternate implementations to the extent permitted.

The invention claimed is:

1. A method comprising:
    electronically translating, by at least one processor during an automated translation process, a first plurality of words in a source language so as to obtain a second plurality of words in a target language, wherein electronically translating comprises:
        performing lexical-morphological analysis of the first plurality of words to generate a lexical-morphological structure of at least one sentence in the first plurality of words,
        performing syntactic analysis using the lexical-morphological structure of the at least one sentence to generate a language-independent semantic structure,
        performing syntactic synthesis based on the language-independent semantic structure to generate the second plurality of words;
    identifying first one or more likely erroneous words in the first plurality of words and corresponding second one or more likely erroneous words in the second plurality of words;
    displaying, on a display device, the first plurality of words in the source language;
    displaying, on the display device, the second plurality of words in the target language;
    automatically indicating, on the display device as part of the automated translation process, the first one or more likely erroneous words within the displayed first plurality of words in the source language;
    automatically indicating, on the display device as part of the automated translation process, the second one or more likely erroneous words within the displayed second plurality of words in the target language;

receiving a change to the first one or more likely erroneous words; and modifying the second plurality of words to provide another translation in the target language based on the change in the first one or more likely erroneous words.

2. The method of claim 1, wherein the first one or more likely erroneous words comprise a word with a lexical error.

3. The method of claim 1, wherein the first one or more likely erroneous words comprise a plurality of words with a syntactical error.

4. The method of claim 1, further comprising displaying two adjacent windows comprising one window for words in the source language and another window for translated words in the target language.

5. The method of claim 1, wherein receiving the change comprises displaying alternatives for substitution with the first one or more likely erroneous words that resemble the first one or more likely erroneous words and providing a capability to select at least one of the alternatives.

6. The method of claim 5, further comprising providing a capability to specify a subject of the first plurality of words and adjusting the alternatives to be consistent with the subject.

7. The method of claim 1, wherein automatically indicating the first one or more likely erroneous words comprises indicating different lexical errors or syntactical errors associated with the first one or more likely erroneous words by different distinctive display styles.

8. The method of claim 7, wherein the lexical errors are identified differently from the syntactical errors.

9. The method of claim 1, wherein identifying the first one or more likely erroneous words comprises identifying one or more words that are not stored in connection with electronically translating the first plurality of words.

10. The method of claim 1, wherein electronically translating comprises computing ratings for syntactic constructions, and wherein identifying the first one or more likely erroneous words comprises identifying one or more words corresponding to the syntactic constructions that have low ones of the ratings.

11. A system comprising:
a display device; and
at least one processor configured to:
electronically translate, during an automated translation process, a first plurality of words in a source language so as to obtain a second plurality of words in a target language, wherein, to electronically translate, the processor is to:
perform lexical-morphological analysis of the first plurality of words to generate a lexical-morphological structure of at least one sentence in the first plurality of words,
perform syntactic analysis using the lexical-morphological structure of the at least one sentence to generate a language-independent semantic structure,
perform syntactic synthesis based on the language-independent semantic structure to generate the second plurality of words, and
identify first one or more potentially erroneous words in the first plurality of words and corresponding second one or more potentially erroneous words in the second plurality of words;
display, on the display device, the first plurality of words in the source language;
display, on the display device, the second plurality of words in the target language;
automatically indicate, on the display device as part of the automated translation process, the first one or more potentially erroneous words within the displayed first plurality of words in the source language;
automatically indicate, on the display device as part of the automated translation process, the second one or more potentially erroneous words within the displayed second plurality of words in the target language;
receive a change to the first one or more potentially erroneous words; and
modify the second plurality of words to provide another translation in the target language based on the change in the first one or more potentially erroneous words.

12. The system of claim 11, wherein the first one or more potentially erroneous words comprise a word with a lexical error.

13. The system of claim 11, wherein the first one or more potentially erroneous words comprise a plurality of words with a syntactical error.

14. The system of claim 11, wherein, to receive the change, the processor is further to display alternatives for substitution with the first one or more potentially erroneous words that resemble the first one or more potentially erroneous words and to provide a capability to select at least one of the alternatives.

15. A non-transitory computer-readable medium having instructions stored therein that, when executed by at least one processor, cause the processor to:
electronically translate, by the processor during an automated translation process, a first plurality of words in a source language so as to obtain a second plurality of words in a target language, wherein, to electronically translate, the processor is to:
perform lexical-morphological analysis of the first plurality of words to generate a lexical-morphological structure of at least one sentence in the first plurality of words,
perform syntactic analysis using the lexical-morphological structure of the at least one sentence to generate a language-independent semantic structure,
perform syntactic synthesis based on the language-independent semantic structure to generate the second plurality of words, and
identify first one or more likely erroneous words in the first plurality of words and corresponding second one or more likely erroneous words in the second plurality of words;
display, on a display device, the first plurality of words in the source language;
display, on the display device, the second plurality of words in the target language;
automatically indicate, on the display device as part of the automated translation process, the first one or more likely erroneous words within the displayed first plurality of words in the source language;
automatically indicate, on the display device as part of the automated translation process, the second one or more likely erroneous words within the displayed second plurality of words in the target language;
receive a change to the first one or more likely erroneous words; and
modify the second plurality of words to provide another translation in the target language based on the change in the first one or more likely erroneous words.

16. The computer-readable medium of claim 15, wherein, to receive the change, the processor is further to display alternatives for substitution with the first one or more likely erroneous words that resemble the first one or more likely erroneous words and to provide a capability to select at least one of the alternatives.

17. The computer-readable medium of claim 16, wherein the instructions further cause the processor to provide a capability to specify a subject of the first plurality of words and to adjust the alternatives to be consistent with the subject.

18. The computer-readable medium of claim 15, wherein, to automatically indicate the first one or more likely erroneous words, the processor is further to indicate different lexical errors or syntactical errors associated with the first one or more likely erroneous words by different distinctive display styles.

19. The computer-readable medium of claim 15, wherein, to electronically translate, the processor is further to compute ratings for syntactic constructions, and wherein, to identify the first one or more likely erroneous words, the processor is further to identify one or more words corresponding to the syntactic constructions that have low ones of the ratings.

* * * * *